Inventor:
A.H.J. de Lassus St-Genies,
by Langner, Parry, Card & Langner
Attys.

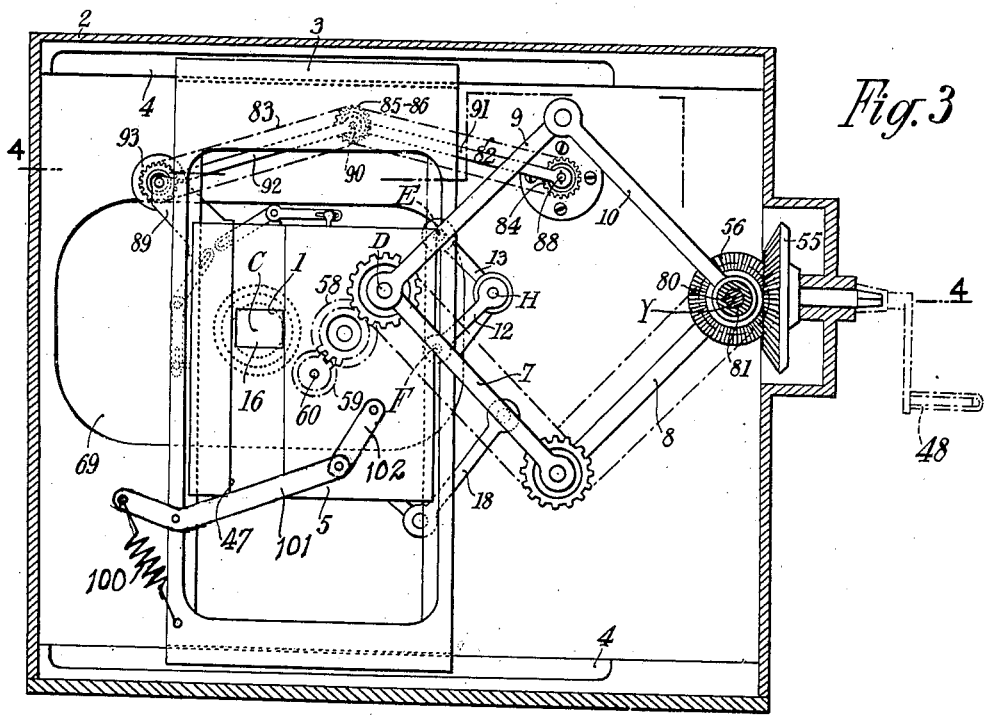

March 22, 1932.   A. H. J. DE L. ST. GENIES   1,850,641
APPARATUS FOR TAKING CINEMATOGRAPHIC FILM VIEWS FROM VARIABLE POSITIONS
Filed Aug. 10, 1926    3 Sheets-Sheet 3

Inventor
A. H. J. de Lassus St. Genies
By E. F. Wenderoth
Atty.

Patented Mar. 22, 1932

1,850,641

UNITED STATES PATENT OFFICE

ANNE HENRI JACQUES DE LASSUS ST-GENIES, OF PARIS, FRANCE

APPARATUS FOR TAKING CINEMATOGRAPHIC FILM VIEWS FROM VARIABLE POSITIONS

Application filed August 10, 1926, Serial No. 128,452, and in France August 22, 1925.

The present invention relates to an apparatus for taking cinematographic film views, in which the body comprising the camera and the lens may be given certain movements, whose nature will be further explained, whereby the views obtained upon the film will be taken from variable positions, the latter being chosen at the will of the operator, within certain limits determined by practice.

My invention has for its object the obtainment of films of such character that when they are projected upon the screen by an ordinary lantern, they will produce images of all the objects which were comprised in the field covered by the camera, said images having relative displacements on the screen such as will obviate superposition or confusion of the planes, such as will inevitably occur with films taken from a single point, said displacements being also such as to afford elements which may be said to be of a kinetic nature, and which are added to the static elements due to the perspective, so that the observer will have the illusion of relief.

For the obtainment of such results, the present invention consists in imparting suitable displacements, by hand control, to the essential elements of the cinematographic chamber or camera, (i. e. the lens and the frame within which the film is successively exposed) said displacements being such that within certain limits, firstly the path followed by the said elements, the speed upon any portion of the said path, and the stopping of the apparatus at any point upon the path, will be determined solely at the operator's will during the continuous unwinding of the film, the displacements being secondly of such nature that during the movement of the camera, an optical line or axis, which is determined by the optical centre of the lens and by a point which is fixed with reference to the said lens frame and is situated in its plane, shall be constantly directed in the space in such manner as to bear upon two fixed straight lines forming a right angle and situated in two front planes placed before the lens; the position of the said planes between infinity and a finite smaller distance, as well as the distance between the said planes, from zero to infinity, being at each moment freely chosen by the operator.

The appended drawings which are given by way of example show a constructional form of my said apparatus.

Fig. 3 is a vertical section of the said apparatus on the line 3—3 of Fig. 4, and viewed from the rear.

Fig. 4 is a horizontal section on the line 4—4 of Fig. 3.

In the following description, the term "frame" designates the movable frame 1 in which the successive plates take their position, i. e. the aperture or gate in the slide of the chamber through which the film passes in a regular manner and is stopped for the photographing of the successive images.

Figure 1:
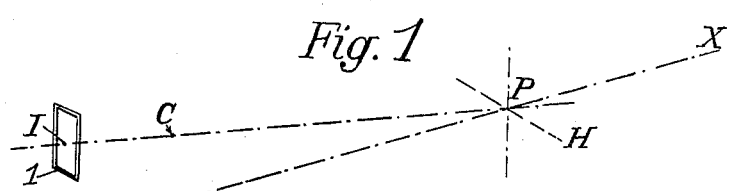
Figs. 1 and 2 are diagrams relative to the functioning of the apparatus.
Figure 2:
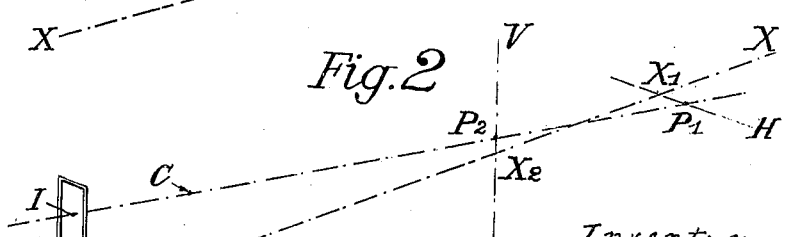

The term "fixed point" designates the point I which is in the fixed position on the said frame, and is situated in the plane of the said frame. This point is always in coincidence with the image of the points $P^1$ and $P^2$ which the operator chooses at will, as above stated, upon two straight lines in space. This fixed point I is usually at the centre of the frame, as shown in Figs. 1 and 2.

The term "axis of the field" designates the ideal straight line which is fixed in space, upon which the operator may choose the points of intersection $X^1$ and $X^2$ which are variable at will, at which points the said axis is intersected by two front planes comprising the orthogonal co-operating lines which have been above described. The "axis of the field" is perpendicular to these front planes.

The term "optical line" designates the optical axis of the lens, which is variable at each instant, and which passes through the "fixed point" I; it constantly meets with the two orthogonal straight lines H and V which intersect the "axis of the field", these straight lines being themselves designated as "supporting lines".

The situation of the "axis of the field" X—X is defined, in space, in the following manner:

The movement of the camera is such that the point I will be displaced in a plane which is usually vertical.

For a well-defined "axis of the field" X—X, the position of this plane, and the position of the "axis of the field" itself, will, during the functioning, be stationary with reference to the ground upon which the apparatus is placed, at the proper height. The "axis of the field" is determined by passing through the optical centre C of the lens a line perpendicular to this plane, when the above-mentioned geometrical point I of the chamber passes through the centre of the limited path in which it is enabled to move. With reference to the movable camera, this line X—X or axis of the field will thus form a stationary axis (usually horizontal) of the space covered by the lens.

The camera may have two distinct adjustments both of which serve to obtain exactly the same results.

Firstly, the main axis of the lens, which is always made perpendicular to the plane of the frame 1, will constantly coincide (for the whole duration of the film exposure) with the optical line connecting the optical centre C with the fixed point I of the frame; or secondly, since the main axis is always perpendicular to the plane of the frame 1, it may take eccentric positions in all directions relatively to the fixed point I, so that the optical line will be defined by a secondary axis.

It will thus be noted that in order to bring the optical line I C into relation at each instant with the two "supporting lines" H and V, the camera is to be given two movements of a somewhat different nature, according to the two adjustments of the camera.

In the first mentioned adjustment of the camera, the camera when moving must rotate with a variable amplitude about a centre of suspension, i. e. a centre which is in coincidence (for instance in the camera) with the geometric point which is movable in the plane normal to the "axis of the field".

In the second adjustment, the different elements of the camera may have simply a straight motion, and each of their points may move in a plane perpendicular to the axis of the field.

But the projections of the displacements of the lens, relatively to the projections of the displacements of the camera or the frame, according to a common direction perpendicular to the "supporting line" H, will be reduced in the ratio $$\frac{P^1C}{P^1I},$$

whilst they will be reduced in the ratio $$\frac{P^2C}{P^2I}$$

in the direction perpendicular to the "supporting line" V.

It is observed that in the two cases, when the optical centre C of the lens is upon the "axis of the field" X—X, there will be, in this sole position, a coincidence between the "optical line", the main axis, and the axis of the field. However, if the "supporting lines" are situated at an infinite distance, there will be a continual parallel relation between the "axis of the field" X—X and the "optical line I C," or the main axis, which thus coincide.

The position of adjustment which is shown by way of example in Figs. 2 and 4 corresponds to the second case.

In the figures, 2 is a case containing the apparatus. The slide 3 is so disposed as to move within the said case solely upon a straight line and in a plane which is determined with reference to the said case and will be made perpendicular (when the said case is secured to a table or a tripod, not shown) to the line above defined as the "axis of the field" X—X.

The said plane, in which the slide is thus movable, is also the plane of the displacement of a plane of the camera, or at least one of its points, according to the construction of the camera.

The chamber 5 is disposed on the said slide in such manner as to assume only a straight movement relatively to the slide, by a method of guiding of the chamber in the slide which is analogous to the method of guiding the slide in the said case.

The two sets of guides are preferably perpendicular to one another; I prefer to place the guides for the slide in the horizontal position, and the guides for the camera in the vertical position.

Since the camera may assume any position within a space represented by a rectangle, due to the guiding method above disclosed, the proper position of the "optical line" will be assured for instance in the following manner.

Upon an axis D—D, which is stationary with reference to the camera, is disposed the vertex of a jointed parallelogram, and preferably the diamond-shaped figure 7—8—9—10. The vertex of the said figure, which is oppositely situated with reference to the axis D—D, is situated upon an axis Y—Y which is stationary with reference to the case 2, and is parallel with the axis D—D.

The said diamond-shaped figure, or large diamond, serves to locate by its deformations the displacements of the camera within the said case, since one configuration of the said diamond, and only one, corresponds to each position of the camera within the box.

Figure 5:
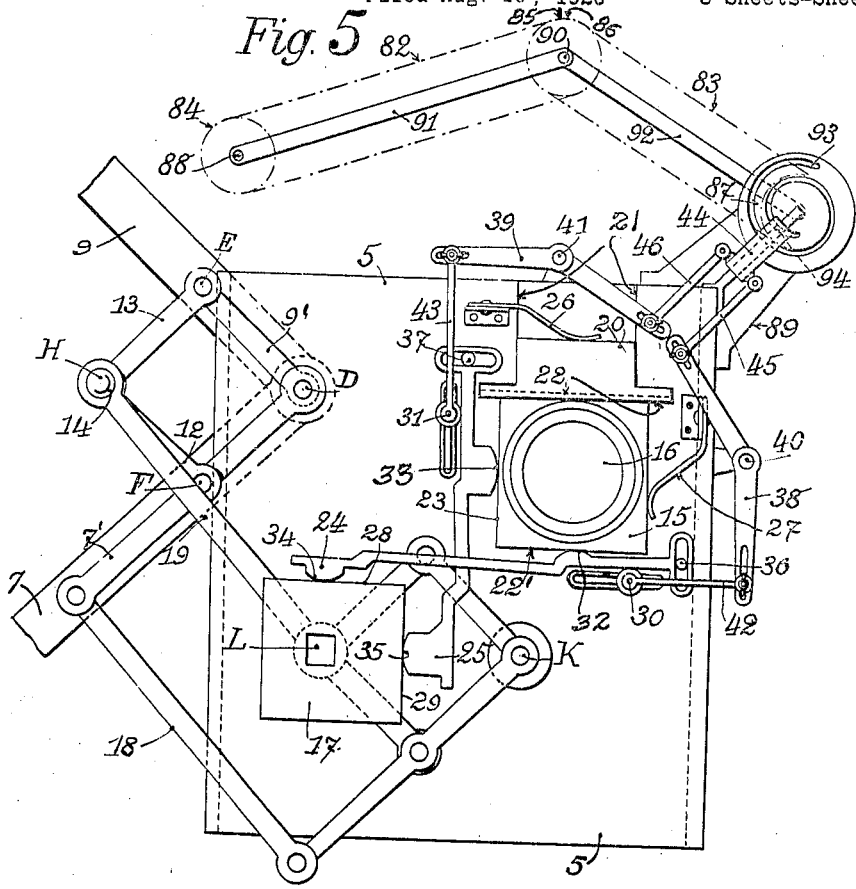
Fig. 5 shows certain details of the apparatus, viewed from the front.

Two small branches 12 and 13, pivotally mounted on a common axle H and as shown in Figs. 3, 4 and 5, pivoted at the points E and F to two small branches 7' and 9' which have at each instant the same angular movements as the branches 7 and 9, will thus form another parallelogram D E H F which is similar to the parallelogram 7—8—9—10 at each instant. The elements of the branches 7 and 9 are pivoted to the branches 7' and 9' in order that they will be given the same angular movements, respectively by the sockets 7" and 9" which traverse the said chamber and are coaxial with the axis D D.

The pivoting axis H which is common to the small arms 12—13 is at a distance from the axis D—D which is a function at each instant, as to direction, value and sense, of the position of the said chamber, and is well defined by this sole position. It will be understood, after what has been above stated, that I may employ a knob 14 rotating on the axle H to provide for the proper action upon the frame 15 of the lens 16, so as to obtain the correct position of the optical line. The same knob, or (according to the respective positions of the different parts mounted on the camera) a member 17 (Fig. 5) having exactly the same motion as the said knob, actuates the frame 15 in the approved manner. In Fig. 5, the member 17 is employed for this purpose. To this effect I utilize for instance a parallelogram whose vertices are at K and L, exactly similar to the parallelogram whose vertices are at D and H, the vertex K being pivoted at a point of the camera 5.

This parallelogram, or small diamond, whose vertices are at K and L, will remain similar to the parallelogram having the vertices D and H, i. e. to the diamond having the vertices D and Y, each of its branches being maintained parallel with the corresponding branch of the large diamond, by means of a mechanical connection such as is above disclosed by way of example in its elements 7'—9'—12—13 and completed in a suitable manner by the connecting links 18 and 19.

It will be noted that the vertex L of the small diamond reproduces the movements of the camera at a fixed scale of reduction. In order that the optical line should be constantly brought upon the two supporting lines H and V, whereof one will be usually horizontal and the other vertical, it will therefore suffice that the motion of the controlling member 17 shall be imparted to the frame of the lens by means of members adapted to decompose such motion according to two directions respectively perpendicular to H and to V, and in each case, in the proper ratio as above determined.

In order to obtain this result, the lens frame 15 is secured to slide 20 or the like, which is slidable in a groove 21 (Fig. 5) in the said camera and comprises a groove 22 by which the frame 15 may be guided.

The directions of the slots 21 and 22 are respectively at right angles to the directions of the "supporting lines". The two flat faces 22' and 23 of the frame 15, which have preferably a 90-degree position, co-operate with the levers 24 and 25 coacting with the member 17. The springs 26 and 27 urge the said frame against the levers, and also urge the said levers against the member 17.

The member 17 comprises two flat faces 28 and 29 which are respectively made parallel with the faces 22' and 23 of the lens frame, for instance by a double-grooved guide by which the axle L is guided, which resembles the guide for the frame 15 and is not shown, the member 17 being rigidly connected with the axle L. The levers 24 and 25 oscillate on round or knife-edge pivots 30 and 31, and coact with the flat faces of the lens frame by means of the round bosses 32—33, and they co-operate by means of like bosses 34—35 with the faces of the member 17, so that the operation will take place as if, firstly, the levers 24—25 were acted upon at the centres of the last-mentioned bosses by the enlarged member 17, and secondly, by the frame 15, to which is to be added the centres of the bosses 32—33. The position of the said levers relatively to the chamber is assured by the knobs 36—37 or the like mounted on the camera and engaged in apertures formed in the said levers, or I may employ any other suitable means for the purpose. I may employ at will the cylinders 30 or 31, or knife-edges, such elements having the same purpose, which consists in assuring the oscillation of the levers 24—25 about a geometrical axis which, in the first case, is the geometrical axis of the cylinder itself, and in the second case coincides with the knife-edge. The proper reduction ratio between the movements of the points C and L is assured by the ratio of the distance— preferably on a straight line—between the centres of the bosses of each lever and the position of the axles 30—31 of the camera. I may displace the said axles at the same time through equal or proportional distances— dependent or independent—so as to change the two reduction ratios above defined at the will of the operator.

For example, the axles 30—31 may be moved at the same time by the levers 38—39 pivoted to the camera at 40—41, respectively, and connected at one end with said axles by the links 42—43 and at the other end to a slide 44 by the links 45—46. The slide 44 should be so disposed as to be operated from the exterior of the case 2, either directly or by any suitable deformable transmission means. When once adjusted, the position of the said parts should be independent of the position of the camera.

The slide 44 may be displaced at any time, in spite of the continual movements of the camera 5, for instance by means of a pivoted transmission device consisting of the chains 82—83 passing around the chain pinions 84—85—86—87, the pinion 84 being mounted on a controlling shaft which is stationary with reference to the case, the pinion 87 being mounted on a support 89 disposed upon the moving camera 5, whilst the two pinions 85—86 are mounted in sequence upon a movable shaft 90 which is held by the links 91—92 at constant distances from the centers of the pinions 84 and 87. The pinion 87 actuates a spiral-grooved cam 93 coacting with a stud 94 mounted on the slide 44, so as to displace the latter in either direction upon its guide according to the direction in which the operator rotates the shaft 88. The ratio given to the two levers 38—39 will depend for instance upon the position given to one or more axles by which the said levers are pivoted to the links 42—43—45—46.

If, in the limit, the round axles or knife edges 30—31 become tangent to the levers 24 and 25, and their axes are brought upon the center of the circular bosses 32—33 of said levers coacting with the frame 15, the said frame will remain fixed upon the camera 5 during all movements of the camera and of the point L; in this event the intersection of the aforesaid supporting lines with the axis of the field will be situated at an infinite distance.

If the ratios of likeness, introduced by the levers 24—25 into the two projections of the motion of the frame 15, are equal, irrespectively of the finite value of this ratio, the movements of the frame 15 will be homothetic relatively to the movements of the member 17, so that the two "supporting lines" of the optical line will intersect at the same point on the "axis of the field," at a distance from the apparatus depending upon the chosen value of this ratio.

If the frame 1 is movable with reference to the camera 5 whilst the lens is secured to the latter, all of the above-described conditions for the motion of the frame 15 will be applicable to the frame 1 which determines the edges of each view, and the said frame will remain attached to the guide 47 in which the film is slidable and which will be rendered movable together with the latter, with reference to the camera 5.

In all cases, the motion of the camera shutter, which determines the motion of the mechanism for the intermittent driving of the film, is controlled from the exterior of the case 2 by the crank 48, or by a motor, and through the medium of the chain wheels 49—50 and 51—52, disposed in identical pairs and connected by the chains 53—54, so that the wheel 52 will have the same rotation as the pinion 49; I employ the gearing 55—56 disposed between the crank 48 and the wheel 49, and other gearing such as 57, 58, 59, or an analogous chain connection between the wheel 52 and the shaft 60 of the shutter device, so as to obtain the proper gear ratio between the crank and the shutter.

The control of all the movements of the camera will be effected from the exterior of the case 2 in any suitable manner; I prefer to secure the branch 8 of the parallelogram D—Y to the shaft 80 and the branch 10 of the same to the tube 81 having the common axis Y—Y; these two members extend through the case 2 and are secured to the branches 62—64 of a parallelogram 61—62—63—64 which is preferably identical to the parallelogram 7—8—9—10, and is so disposed that in the vertical projection shown in Fig. 2, these two parallelograms will be projected upon one another. Herein the hand control knob 65 will be given the same movement which is to be imparted to the camera 5 (or to the frame substituted therefor). The unwinding of the film 66—which is contained as usual in the holders 67 which are inserted for instance through light-tight doors into the case 2—and the winding of said film after passing through the guideway 47 of the camera, will be effected in the ordinary manner by mechanical means (not shown) which is actuated by the handle 48, care being taken to render the film sufficiently slack to provide for the displacements of the chamber.

The shutter is constituted by a rotary disc 103, mounted on the shaft 60 which extends through the camera 5 and which is controlled by the above described deformable transmission gear.

Figure 7:
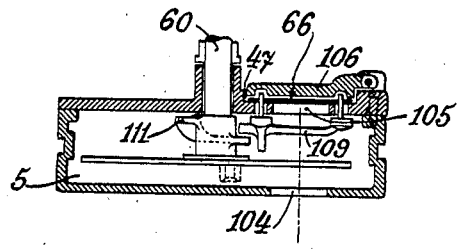
Fig. 7 is horizontal cross section passing by the axis of the shutter.

Fig. 7 shows the opening 104 in front of which the movable frame of the lens represented in Fig. 5 is to be placed.

Opposite said opening, on the rear wall of the camera 5, is provided the opening with a rectangular frame 105 corresponding to the size of the pictures which are to be recorded on the film 66. The said film passes between the walls of the guideway 47 and a pivoted flap 106.

Figure 6:
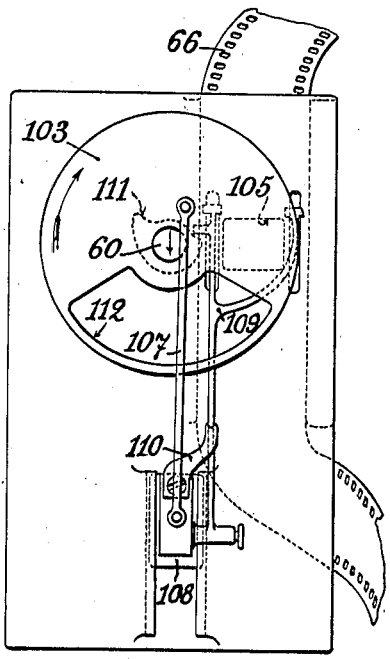
Fig. 6 is an elevation of a camera the front wall of which has been removed to show the internal mechanism.

Fig. 6 shows the internal mechanism: a rod 107 pivoted on the shutting disc 103 urges a slide 108 to one side of which is articulated a fork 109 the prongs of which are used for driving the film in an intermittent manner. A spring blade 110 provided on the slide and a cam 111 provided on the shaft 60 cause the prongs of the fork 109 to enter the perforations of the film or to be removed therefrom at the end of the stroke of said fork.

An arrow indicates the direction of rotation of the disc 103; it will be seen that the film is moving down to an extent which is equal to the motion of the prongs and also to the height of a picture, for half a revolution of the shaft 60, while the film 66 situated behind the opening 105 is protected from the light rays coming from the lens through the plain portion of the shutter. During the other half-revolution or a fraction of the latter, the film is exposed owing to the sector-shaped window 112 provided in the shutter.

The arrangement of the said shutter and that of the film driving mechanism are moreover well known and do not disclose any particular feature relatively to the invention as claimed. It is possible to modify them or to use any other suitable shutting and driving means without departing from the invention.

The frame 15 (or the camera 5 itself) may be connected with a light-screen 68 which is secured to a deformable flexible membrane 69 which is light-tight and follows all the movements of the camera, it being further secured to the edges of a sufficient aperture formed in the wall of the case 2.

I may employ a brake 70 acting upon the sectors 71—72 which are respectively secured to the shaft 80 and the tube 81, the said brake being displaced by a lever 73 pivoting at 74 to the case and controlled at regular intervals by the cams 75 mounted on the gear wheel 55.

The crank 48 is preferably operated by an assistant (or by a motor), whilst the operator has charge of the knob 65 and also controls the position of the axles 30 and 31.

In order to facilitate the functioning, I may utilize a spring 100 and a device comprising a lever 101 and a link 102 for balancing the weight of the movable parts such as the frame, jointed parallelogram, or the like.

According to the invention, and irrespectively of the construction of the camera, the "optical line" I—C is caused to describe, adjacent the "axis of the field", a regulated complex surface which can be changed by the operator at all times. In this event the fixed point of the frame will represent, for each film view, the image of all the points which vary from one view to another and which are situated upon the "optical line".

When the film is projected on the screen by an ordinary lantern, it will be understood that since the "fixed point" occupies upon the successive film views the same position which is exactly located with reference to the edges of each film view (or to the edges of its framing aperture), thus forming upon the screen a well-determined point which is always the same with reference to the edges of the screen, this latter point will represent the projection—for each view—of all the points in the cinematographic space encountered by the "optical line" in each position of this line corresponding to each view.

Relatively to the stationary edges of the screen, it will be thus observed that all the points forming the several objects of the view upon the screen will appear to be in motion during the travel of the film, thus having complex movements whose nature and amplitude will depend upon the displacements given to the "optical line" by the operator while taking the views, and will be simultaneously a function of the distance between the several objects in space.

Obviously, the movements of the camera will be greater (as a rule) and the "supporting lines" will be farther from the apparatus, according as the operator desires to produce the suitable effects in planes situated at a greater distance, and inversely, but without any compulsory conditions for this process. The movements given to the camera will for instance be determined according to the movements of the subjects in the field, or otherwise these movements, which I prefer to change frequently in direction, will follow paths in the form of an S or L, or in zigzag, in any suitable directions and jointed together in any manner at the will of the operator.

Having thus described my apparatus, what I claim as new therein, and my own invention, is:

1. In an apparatus for taking moving pictures from variable points, freely chosen by the operator, the combination of a lens, a guiding frame in which the film passes, hand controlling means for displacing the said lens and said frame respectively, and comprising connecting means between the said lens and said frame, the said connecting means being so proportioned that an optical line, determined by the optical center of the lens, and a selected point in the interior of the said frame, is in constant contact with two imaginary straight lines situated in two planes in the space in front of the lens.

2. In an apparatus for taking moving pictures from variable points, freely chosen by the operator, the combination of a lens, a frame in which the film passes, controlling means operable to displace the said lens to vary the line of focus thereof, controlling means operable to displace the said frame, means establishing connection between the said first mentioned means, and hand-controlled means for actuating one of the said first mentioned means, the component parts of said connecting means being so proportioned that the projections in ordinates and abscissæ of the movements of the frame will have, with the corresponding projections of the movements of the lens, a definite relation of similitude for each projection, said relation depending on the operator's will.

3. In an apparatus for taking moving pictures from variable points, freely chosen by the operator, the combination of a lens, a frame in which the said lens is mounted, jointed parallelograms, operative connection between the same and the lens and frame to effect the displacement of the said lens and frame, and means for adjusting the said parallelograms by hand from the exterior of the apparatus.

4. In an apparatus for taking moving pictures from variable points, freely chosen by the operator, the combination of a lens, a frame in which the said lens is mounted, jointed parallelograms, operative connection between the same and the lens and frame to effect the displacement of the said lens and frame, means for adjusting the said parallelograms by hand from the exterior of the apparatus, a shutter, a controlling device for the mechanism of the said shutter, a mechanism for actuating the film, and a kinematic connection between the said controlling device and the said film actuating mechanism for effecting synchronous operation of the device and mechanism.

5. In an apparatus for taking moving pictures from variable points, freely chosen by the operator, the combination of a lens, a frame in which the said lens is mounted, controlling devices operable to displace the said lens, controlling devices operable to displace the said frame, kinematic connecting means between the said devices, and hand-controlled means operable to actuate one of the said devices, a case containing the whole apparatus, and a light-tight deformable sleeve connecting the said lens and frame with the said case.

In testimony whereof I have hereunto affixed my signature.

ANNE HENRI JACQUES de LASSUS ST-GENIES.